United States Patent [19]

Makino et al.

[11] Patent Number: 4,485,056

[45] Date of Patent: Nov. 27, 1984

[54] PRODUCTION OF AROMATIC POLYIMIDE SEPARATING MEMBRANES

[75] Inventors: Hiroshi Makino; Yoshihiro Kusuki; Takashi Harada; Hiroshi Shimazaki; Tosio Isida, all of Ichihara, Japan

[73] Assignee: Ube Industries, Ltd., Chiba, Japan

[21] Appl. No.: 384,495

[22] Filed: Jun. 3, 1982

[30] Foreign Application Priority Data

Jun. 22, 1981 [JP] Japan .................................. 56-95388

[51] Int. Cl.³ .............................................. B29D 27/00
[52] U.S. Cl. .................... 264/41; 210/500.2; 264/331.19; 264/DIG. 62
[58] Field of Search ......... 264/216, 41, 184, DIG. 62, 264/331.19; 210/500.2

[56] References Cited

U.S. PATENT DOCUMENTS

| 3,247,165 | 4/1966 | Rodio | 264/216 |
| 3,541,057 | 11/1970 | Kreuz | 264/216 |
| 3,600,361 | 8/1971 | Heacock et al. | 264/216 |
| 3,710,945 | 1/1973 | Dismore | 264/41 |
| 3,862,897 | 1/1975 | Gattus et al. | 264/216 |
| 3,867,500 | 2/1975 | Traynor | 264/216 |
| 3,917,761 | 11/1975 | Scheuerlein et al. | 264/41 |
| 4,113,628 | 9/1978 | Alegranti | 210/500.2 |
| 4,240,914 | 12/1980 | Iwama et al. | 210/500.2 |
| 4,378,324 | 3/1983 | Makino et al. | 264/216 |

FOREIGN PATENT DOCUMENTS 56-70805  6/1981  Japan ................................ 210/500.2

Primary Examiner—James Lowe
Attorney, Agent, or Firm—Burgess, Ryan & Wayne

[57] ABSTRACT

An aromatic polyimide separating membrane is produced by a process comprising the steps of:

forming a thin film of a dope solution containing an aromatic polyamic acid dissolved in a polar organic solvent at a temperature of approximately 100° C. or less;

coagulating the thin dope solution film in a coagulating liquid containing at least 60% by volume of at least one member selected from water and lower aliphatic alcohols at a temperature of 60° C. or less;

drying the resultant coagulated aromatic polyamic acid membrane; and heating the dried aromatic polyamic acid membrane at a temperature of 100° C. to 300° C. to convert it to an aromatic polyimide membrane.

15 Claims, No Drawings

PRODUCTION OF AROMATIC POLYIMIDE SEPARATING MEMBRANES

FIELD OF THE INVENTION

The present invention relates to a process for producing a aromatic polyimide separating membrane. More particularly, the present invention relates to a process for producing an aromatic polyimide separating membrane from a dope solution containing an aromatic polyamic acid.

The aromatic polyimide separating membrane prepared in accordance with the process of the present invention exhibits an excellent gas- and liquid-separating or concentrating property, an excellent heat-resistance, a superior resistance to chemicals and satisfactory mechanical properties. That is, the separating membrane produced in accordance with the present invention exhibits an extremely large permeating rate of gas such as helium, hydrogen, carbon monoxide, oxygen or nitrogen gas and is capable of separating the above-mentioned gases from each other or of concentrating each gas. Also, the separating membrane produced by the process of the present invention can be used for the purpose of gas- or liquid-separation or concentration at a higher temperature than that at which conventional separating membranes can be used. The separating membrane may be in the form of a flat porous membrane, a flat asymmetrical composite membrane consisting of a porous constituent and a dense constituent, or a hollow fiber.

BACKGROUND OF THE INVENTION

It is well known that an aromatic polyimide asymmetric composite membrane or film can be produced from a dope solution of a corresponding polyamic acid, which is a precursor polymer of the polyimide, by means of a wet membrane-forming process. For example, the above-mentioned type of process is disclosed in Japanese patent application Laid-open (Kokai) No. 49-45152. In this type of process, the dope solution containing the polyamic acid is formed into a thin film and the thin dope solution film is coagulated by immersing it in a coagulating liquid containing an imide-cyclization compound consisting essentially of a lower aliphatic carboxylic acid and a tertiary amine. In this coagulating procedure, the polyamic acid is imide-cyclized so as to be converted into the corresponding polyimide. That is, in this conventional coagulating procedure, the coagulation of the thin dope solution film is carried out simultaneously with the imide-cyclization of the aromatic polyamic acid. Therefore, it is difficult to stably produce the polyimide separating membrane having a satisfactory gas separating property in a satisfactory reproductivity thereof. Also, the resultant product is an asymmetrical composite membrane and, therefore, exhibits a relatively poor permeating rate of the gases when used as a gas separating or gas concentrating membrane.

Under the above-mentioned circumstances, it was strongly desired to provide a new process for producing an aromatic polyimide membrane having a porous structure and exhibiting an enhanced permeating rate of a gas or liquid therethrough and, therefore, being useful as a separator of a gas or liquid mixture and as a concentrator of a gas or liquid, from a polyamic acid.

The inventors of the present invention found that in the wet membrane-forming process in which a dope solution containing an aromatic polyamic acid is used, an aromatic polyimide separating membrane which is free from the above-mentioned disadvantages of the conventional separating membranes, could be produced by forming the thin dope solution film at a relatively low temperature; by coagulating the dope solution film in a coagulating liquid containing, as a main component, water and/or at least one lower aliphatic alcohol so as to form a precursory polyamic acid membrane; and by drying and then heating the coagulated polyamic acid membrane at an elevated temperature so as to imide-cyclize the amide-acid structure in the polyamic acid into an imide structure and to provide an aromatic polyimide separating membrane.

SUMMARY OF THE INVENTION

An object of the present invention is to provide a process for producing an aromatic polyimide separating membrane having excellent permeating rate of a gas or liquid form a corresponding aromatic polyamic acid.

Another object of the present invention is to provide a process for producing an aromatic polyimide separating membrane useful as a separator of a gas or liquid mixture and as a concentrator of a gas or liquid, especially at an elevated temperature.

The above-mentioned objects can be attained by the process of the present invention which comprises the steps of:

forming a thin film of a uniform dope solution containing an aromatic polyamic acid dissolved in a polar organic solvent at a temperature of approximately 100° C. or less;

bringing said thin film of said aromatic polyamic acid dope solution into contact with a coagulating liquid containing at least 60% by volume of at least one member selected from the group consisting of water and lower aliphatic alcohols at a temperature of 60° C. or less, thereby forming a coagulated membrane of said aromatic polyamic acid;

drying said coagulated aromatic polyamic acid membrane; and heating said dried aromatic polyamic acid membrane at a temperature of 100° C. to 300° C. thereby converting said aromatic polyamic acid membrane to an aromatic polyimide membrane.

DETAILED DESCRIPTION OF THE INVENTION

In the first step of the process of the present invention, a uniform dope solution containing an aromatic polyamic acid dissolved in a polar organic solvent is formed into a thin film thereof at a temperature of approximately of 100° C. or less, preferably, 80° C. or less by a conventional dope solution film-forming method, for example, a usual dope solution-spreading method in which the dope solution is spread on a smooth surface of a substrate to form a thin film of the dope solution.

The aromatic polyamic acid usable for the process of the present invention has a high molecular weight and is produced by polymerizing an aromatic tetracarboxylic acid component with an aromatic diamine component at a temperature of 120° C. or less, preferably, 100° C. or less in a conventional manner, and is usable as a precursor polymer of a corresponding aromatic polyimide.

The aromatic polyamic acid preferably contains, in the main chain thereof, at least 60 molar %, preferably from 70 molar % to 100 molar %, of at least one type of recurring unit of the formula (I):

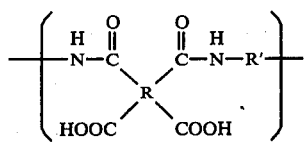

wherein R represents a tetravalent aromatic radical which may be a residue derived from an aromatic tetracarboxylic acid component, and R' represents a divalent aromatic radical which may be a residue derived from an aromatic diamine component.

The aromatic polyamic acid can be prepared by polymerizing a carboxylic acid component consisting of at least one aromatic tetracarboxylic acid compound with a diamine component consisting of at least one aromatic diamine compound in the medium of a polar organic solvent at a temperature of 120° C. or less, preferably, 100° C. or less more preferably, from 0° C. to 80° C. In the preparation of the polyamic acid, the carboxylic acid component and the diamine component are preferably used in the substantially same molar amount to each other. The amount of either one of the two components may be about 5 molar % or less above the amount of the other component.

The aromatic tetracarboxylic acid compound may be selected from the group consisting of biphenyl tetracarboxylic acids, for example, 3,3',4,4'-biphenyl tetracarboxylic acid, 2,3,3',4'-biphenyl tetracarboxylic acid, and 2,2',3,3'-biphenyl tetracarboxylic acid; benzophenone tetracarboxylic acid, for example, and 3,3',4,4'-benzophenone tetracarboxylic acid; and 2,3',4'-benzophenone tetracarboxylic acid; 2,2-bis (3,4-dicarboxyhenyl) propane; bis (3,4-dicarboxyphenyl) methane; bis (3,4-dicarboxyphenyl) sulfone; bis (3,4-dicarboxyphenyl) ether; bis (3,4-dicarboxyphenyl) thioether; pyromellitic acid; and, anhydrides, salts and lower alcohol esters of the above-mentioned acids.

The aromatic diamine compound may be selected from those of the formula $H_2N-R'-NH_2$, wherein R' is the same as defined above. It is preferable that the aromatic diamine compound be selected from the group consisting of those of the following formulae (II), (III), (IV) and (V):

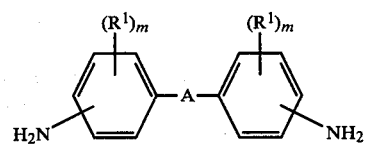

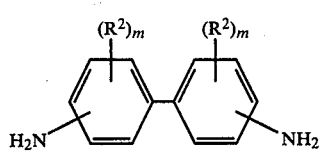

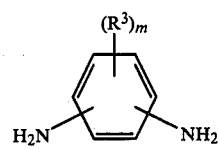

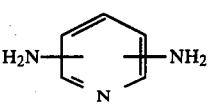

wherein $R^1$, $R^2$, and $R^3$ respectively represent, independently from each other, a member selected from the group consisting of hydrogen, lower alkyl radicals having 1 to 3 carbon atoms and lower alkoxyl radicals having 1 to 3 carbon atoms; A represents a divalent linking member selected from the class consisting of —O—, —S—, —CO—, —SO$_2$—, —SO—, —CH$_2$— and —C(CH$_3$)$_2$—; and m represents an integer of from 1 to 4.

Specific examples of the aromatic diamine usable for the process of the present invention are diamino-diphenyl ether compounds, for example, 4,4'-diaminodiphenyl ether, 3,3'-dimethyl-4,4'-diaminodiphenyl ether, 3,3'-dimethoxy -4,4'-diaminodiphenyl ether, and 3,3'-diaminodiphenyl ether and 3,4'-diaminodiphenyl ether; diaminodiphenyl thioether compounds, for example, 4,4'-diaminodiphenyl thioether, 3,3'-dimethyl-4,4'-diaminodiphenyl thioether and 3,3'-diaminodiphenyl thioether; diaminobenzophenone compounds, for example, 4,4'-diaminobenzophenone, 3,3'-diaminobenzophenone and 3,3'-dimethyl-4,4'-diaminobenzophenone; diaminodiphenyl methane compounds, for example, 4,4'-diaminodiphenyl methane 3,3'-dimethoxy-4,4'-diaminodiphenyl methane and 3,3'-diaminodiphenyl methane; diaminodiphenyl propane compounds, for example, 2,2-bis (4-aminophenyl) propane and 2,2-bis (3-aminophenyl) propane; 4,4'-diaminodiphenyl sulfoxide; diaminodiphenyl sulfones, for example, 4,4'-diaminodiphenyl sulfone and 3,3'-diaminodiphenyl sulfone; diamino-biphenyls, for example, benzidines, 3,3'-dimethyl benzidine, 3,3'-dimethoxy benzidine and 3,3'-diaminobiphenyl o-, m- and p-phenylenediamines; diaminopyridine compounds; for example, 2,6-diaminopyridine and 3,6-diaminopyridine.

The polar organic solvent usable for the preparation of the aromatic polyamic acid may consist essentially of at least one member selected from the group consisting of acetamide, formamide, N,N-dimethylformamide, N,N-dimethyl acetamide, N,N-diethylacetamide, dimethyl sulfoxide, diethylsulfoxide, hexamethylphosphoric amide, N-methyl-2-pyrrolidone, pyridine, dimethyl sulfone, tetramethylene sulfone, dimethyltetramethylene sulfone, tetramethyl area and tetraethylmethane.

In the process of the present invention, the dope solution containing the polyamic acid may consist of a polymerization solution per se obtained by polymerizing the aromatic tetracarboxylic acid component with the aromatic diamine component in the polar organic solvent at a relatively low temperature, or may be prepared by concentrating or by diluting the polymerization solution with an additional amount of the polar organic solvent. Also, the dope solution may be prepared by isolating the polyamic acid from the polymerization solution and, then, by uniformly dissolving the isolated polyamic acid in a necessary amount of a polar organic solvent.

The aromatic polyamic acid usable for the process of the present invention preferably has a logarithmic viscosity of from 0.3 to 7, more preferably, from 0.4 to 5, determined in a concentration of 0.5 g per 100 ml of N--methyl-2-pyrrolidone at a temperature of 30° C.

In the dope solution usable for the process of the present invention, the polyamic acid is preferably in a concentration of from 3% to 50% by weight, more preferably, from 5% to 40% by weight, still more preferably, from 5% to 30% by weight. Also, it is preferable that the dope solution exhibits a rotation viscosity of from 1 to 100,000 poises, more preferably, from 10 to 50,000 poises, at a temperature of 30° C.

In the process of the present invention, the forming procedure for the thin film of the dope solution is carried out at a relatively low temperature of approximately 100° C. or less so as to restrict the conversion of the polyamic acid to the corresponding polyimide. If the dope solution film-forming temperature is more than approximately 100° C., the conversion of the polyamic acid to the corresponding polyimide is excessively promoted and the resultant membrane is not a porous membrane or an asymmetric membrane. Therefore, the final polyimide membrane exhibits a poor permeating rate of a gas or liquid and, therefore, is useless as a separating membrane. Accordingly, it is necessary that the dope solution film-forming procedure is carried out at a relatively low temperature at which substantially no imide-cyclization reaction of the polyamic acid takes place, preferably, 80° C. or less, more preferably, 60° C. or less.

It is preferable that the thin film of the dope solution is formed in a thickness of from 5 to 1000 microns, more preferably, from 10 to 500 microns.

Before the dope solution film-forming procedure is carried out, it is preferable that the dope solution be filtered and degassed at a temperature of from 0° C. to 100° C., preferably, from 20° C. to 60° C.

In the second step of the process of the present invention, the thin dope solution film is brought into contact with a coagulating liquid containing 60% by volume or more, preferably, from 70% by volume or more, more preferably, from 80% to 100% by volume of a principal liquid consisting of at least one member selected from the group consisting of water and lower aliphatic alcohols, at a temperature of 60° C. or less, preferably, from −20° to 50° C., so as to form a coagulated polyamic acid membrane which is a precursory product of the corresponding aromatic polyimide membrane.

The above-mentioned lower aliphatic alcohols may be selected from those having 1 to 5 carbon atoms, for example, methyl alcohol, ethyl alcohol, propyl alcohols, butyl alcohols and pentyl alcohols.

The coagulating liquid may consist of water alone, at least one lower aliphatic alcohol alone or a mixture of water and at least one lower aliphatic alcohol. The coagulating liquid usable for the process of the present invention may contain, in addition to the principal liquid consisting of water and/or the lower aliphatic alcohols, an additive liquid which is compatible with the principal liquid. The additive liquid may consist of at least one member selected from the group consisting of ketone compounds, for example, acetone, and cyclohexanone; polyhydric alcohols, for example, ethylene glycol and propylene glycol; polyethers of the polyhydric alcohols, for example, ethyleneglycoldimethyl ether and ethyleneglycoldiethyl ether and lower aliphatic monocarboxylic acids, for example, formic acid and acetic acid.

In the coagulating procedure, it is necessary that the temperature of the coagulating liquid is adjusted to approximately 60° C. or less. If the temperature of the coagulating liquid is excessively high, the resultant aromatic polyimide membrane exhibits an unsatisfactory gas or liquid-separating property. Therefore, the coagulating procedure should be carried out at a temperature of 60° C. or less, preferably, 50° C. or less, and of more than the freezing point of the coagulating liquid.

In order to carry out the contact of the thin film of the dope solution with the coagulating liquid, it is preferable to immerse the thin dope solution film in the coagulating liquid for a period of time necessary to complete the coagulation of the thin dope solution film. The coagulating time is variable depending on the type and concentration of the aromatic polyamic acid in the dope solution, the thickness of the thin dope solution film and the type and temperature of the coagulating liquid. Usually, the coagulating time is in the range of from 0.01 to 50 hours, preferably, from 0.1 to 30 hours.

In the process of the present innvention, the coagulated polyamic acid membrane is removed from the coagulating liquid and then, dried and heated at an elevated temperature so as to substantially completely convert the polyamic acid to the corresponding polyimide by imide-cyclizing the amide-acid structure in the polyamic acid.

The drying procedure for the coagulated polyamic acid membrane is carried out preferably at a temperature of from 30° C. to 150° C., more preferably, from 50° C. to 140° C. It is also preferable that the drying procedure is carried out in an inert gas atmosphere, for example, a nitrogen gas atmosphere. The drying procedure may be carried out under a reduced pressure at a low temperature, for example, 20° C. to 100° C.

The dried polyamic acid membrane is subjected to the heating procedure in which the polyamic acid membrane is heated so as to reach a temperature of 100° C. to 300° C., preferably, 150° C. to 260° C. If the heating procedure is carried out at an excessively high temperature, the resultant polyimide membrane exhibits an unsatisfactory permeating rate of gases or liquids. Therefore, it is preferable that the heating procedure is carried out at a temperature as low as possible as long as the temperature is sufficiently high for completing the imide-cyclization of the amide-acid structure in the polyamic acid. For this reason, the heating procedure is carried out at a temperature of 100° C. or more but not exceeding 300° C.

Usually, the heating procedure for the polyamic acid membrane is carried out for 0.1 to 50 hours, preferably, 0.2 to 30 hours, more preferably, 0.3 to 10 hours. It is also preferable that the heating procedure is carried out in an inert gas atmosphere, for example, a nitrogen gas atmosphere.

The thickness of the aromatic polyimide separating membrane of the present invention is not limited to a specific value, and usually within the range of from 1 to 200 microns, preferably, 5 to 100 microns.

The aromatic polyimide separating membrane of the present invention is porous and allows various gases and liquids to permeat therethrough. For example, the aromatic polyimide separating membrane of the present invention exhibits a hydrogen gas-permeating rate of $5 \times 10^{-5}$ cm$^3$/cm$^2$.sec.cmHg or more. The ratio ($P_{H_2}/P_{CO}$) of hydrogen gas-permeating rate ($P_{H_2}$) to carbon monoxide gas-permeating rate ($P_{CO}$) is in the range of from 2.0 to 10, preferably, from 2.5 to 5.0.

The polyimide membrane of the present invention may be a porous membrane, an asymmetrical membrane or a semi-permeable membrane which may be in the form of a flat film, hollow fiber, or hollow tube. Also, the polyimide membrande of the present invention is usable not only as a separator of a gas mixture or a liquid mixture and as a concentrator of the gas or liquid substance, but also, as an ultrafilter membrane.

The polyimide membrane of the present invention exhibits an excellent heat resistance and therefore, can be used within the temperature range of from room temperature to an elevated temperature of 200° C.

SPECIFIC EXAMPLES

Examples of the present invention and comparative examples are illustrated below.

In the examples and comparative examples, the gas-permeability of the polyimide membrane was determined by the following gas-transmission test. In the test, membrane to be tested was placed in a stainless steel cell having a permeating area of 14.65 cm². Hydrogen gas was supplied to the cell at a temperature of 30° C. under a pressure of from 0.5 to 1 kg/cm²G in one test, and carbon monoxide gas in another. An amount (volume) of the gas passed through the membrane was measured by using a flow meter.

The gas-permeability (P) of each gas was calculated from the following equation:

Gas-permeability (P)
(cm³/cm².sec.cmHg)=$X/A \times T \times D$ wherein X represents an amount (volume) in cm³ (STP) of the gas passed through the membrane, A represents a permeating surface area in cm² of the membrane through which the gas passed, T represents a transmission time in seconds of the gas through the membrane, and D represents a difference in pressure in cmHg between the gas-supply side and the opposite side of the membrane.

The separating property of the polyimide membrane was represented by a ratio ($PH_2/PCO$) of the hydrogen gas-permeating rate ($PH_2$) to the carbon monoxide gas-permeating rate (PCO) of the membrane.

EXAMPLE 1

(Preparation of Dope Solution A)

A separable flask equipped with a stirrer and a conduit for introducing thereinto nitrogen gas, was charged with 40 millimoles of 3,3',4,4'-biphenyl tetracarboxylic dianhydride (BPDA), 40 millimoles of 4,4'-diaminodiphenyl ether (DADE) and 178 g of N-methyl-2-pyrrolidone (NMP). The reaction mixture was subjected to a polymerization procedure at a temperature of 20° C. for 7.5 hours while flowing nitrogen gas through the conduit and the flask, to prepare a solution containing 10% by weight a polyamic acid dissolved in NMP.

The resultant polyamic acid solution A exhibited a rotation viscosity of approximately 2500 poises at a temperature of 30° C. The polyamic acid in the solution exhibited a logarithmic viscosity of 1.95 determined in a concentration of 0.5 g per 100 ml of NMP at a temperature of 30° C.

The logarithmic viscosity of the polyamic acid was calculated in accordance with the following equation.

Logarithmic viscosity =

$$\frac{\text{natural logarithm}\left(\frac{\text{viscosity of solution}}{\text{viscosity of solvent}}\right)}{\text{concentration of polymer in solution}}$$

EXAMPLE 2

(Preparation of Dope Solution B)

The same type of separable flask as that described in Example 1 was charged with 40 millimoles of 3,3',4,4'-benzophenonetetracarboxylic dianhydride (BTDA), 40 millimoles of 4,4'-diaminodiphenyl ether (DADE) and 188 g of N-methyl-2-pyrrolidone (NMP). The reaction mixture was subjected to a polymerization procedure at a temperature of 20° C. for 60 hours while flowing nitrogen gas through the flask to prepare a solution containing 10% by weight of a polyamic acid dissolved in NMP.

The resultant solution B exhibited a rotation viscosity of approximately 2100 at a temperature of 30° C. The polyamic acid in the solution B exhibited a logarithmic viscosity of 1.5 determined in the same manner as that described in Example 1.

EXAMPLE 3

(Preparation of Dope Solution C)

The same procedures as those described in Example 2 were carried out except that 3,3',4,4'-benzophenonetetracarboxylic dianhydride (BTDA) was replaced by pyromellitic dianhydride (PMDA), to prepare a solution C containing 9% by weight of a polyamic acid dissolved in NMP.

The resultant polyamic acid solution has a rotation viscosity of approximately 220 poises. The polyamic acid in the solution C exhibited a logarithmic viscosity of 1.1 determined under the same conditions as those described in Example 1.

EXAMPLE 4

The polyamic acid solution A prepared in Example 1 was filtered and degased under pressure so as to provide a dope solution A.

The dope solution A was spread on a surface of a horizontal glass plate at a temperature of approximately 20° C. by using a doctor blade. A thin film of the dope solution A having a thickness of 200 microns was formed.

The thin dope solution film was immersed in a coagulating liquid consisting of methyl alcohol at a temperature of approximately 20° C. for approximately 15 hours, to prepare a coagulated polyamic acid membrane.

The coagulated polymeric acid membrane was air dried at room temperature while blowing air for approximately 30 minutes, and then at a temperature of 100° C. in a nitrogen gas atmoshpere for one hour. The dried membrane was heated at a temperature or 200° C. for approximately 2 hours so as to substantially complete the imide-cyclization of the polyamic acid. A polyimide separating membrane was obtained.

The gas-permeating test was applied to the membrane. The results are indicated in Table 1.

EXAMPLE 5

The same procedure as that described in Examples 1 was carried out except that the coagulating liquid consisted of water alone. The gas-permeating test results of the resultant polyimide separating membrane are indicated in Table 1.

EXAMPLE 6

The same procedure as that described in Example 4 was carried out except that the dope solution B was used in place of the dope solution A.

The results of the gas-permeating test applied to the resultant polyimide separating membrane are indicated in Table 1.

EXAMPLE 7

The same procedure as that described in Example 4 was carried out except that the dope solution C was used in place of the dope solution A.

The results of the gas-permeating test applied to the resultant polyimide separating membrane are shown in Table 1.

COMPARATIVE EXAMPLE 1

The dope solution A was spread on a surface of a horizontal glass plate at a temperature of approximately 20° C. by using a doctor blade so as to form a thin film of the dope solution A having a thickness of 0.1 mm.

The thin dope solution film was immersed in a coagulating liquid consisting of a solution containing 1 molar % of triethyl amine and 1 molar % of acetic anhydride dissolved in benzene, at room temperature for 15 minutes and then, at a temperature of 60° C. for 60 minutes. A coagulated polyimide membrane was obtained. The polyimide membrane was washed with benzene and then with methyl alcohol. The washed polyimide membrane was dried at a temperature of approximately 20° C. by letting it stand in the ambient atmosphere for 24 hours. A polyimide separating membrane was obtained.

The results of the gas-permeating test applied to the membrane are shown in Table 1.

COMPARATIVE EXAMPLE 2

The same procedures as those described in Example 4 were carried out except that the dope solution C described in Example 3 was used in place of the dope solution A, and the coagulating liquid consisted of acetone alone. The results of the gas-permeating test applied to the resultant membrane are shown in Table 1.

COMPARATIVE EXAMPLE 3

The same procedures as those described in Comparative Example 2 were carried out except that the coagulating liquid consisted of 8 parts by weight of acetone and 2 parts by weight of water. The results of the gas-permeating test applied to the resultant membrane are shown in Table 1.

COMPARATIVE EXAMPLE 4

The same procedures as those described in Comparative Example 2 were carried out except that the coagulating liquid consisted of 8 parts by weight of acetone and 2 parts by weight of methyl alcohol. The results of the gas-permeating test applied to the resultant membrane are indicated in Table 1.

TABLE 1

| Example No. | Dope solution | | | Result of gas-permeating test | |
|---|---|---|---|---|---|
| | | Component monomer | | Hydrogen gas permeability ($cm^3/cm^2 \cdot sec \cdot cmHg$) | Gas separating Property ($P_{H_2}/P_{CO}$) |
| | Type | Acid | Diamine | | |
| Example 4 | A | BPDA | DADE | $6.0 \times 10^{-3}$ | 3.5 |
| Example 5 | A | " | " | $1.6 \times 10^{-3}$ | 3.0 |
| Example 6 | B | BTDA | " | $6.0 \times 10^{-3}$ | 3.1 |
| Example 7 | C | PMDA | " | $1.1 \times 10^{-2}$ | 2.6 |
| Comparative Example 1 | A | BPDA | " | $4.1 \times 10^{-7}$ | 25.6 |
| Comparative Example 2 | C | PMDA | " | $1.4 \times 10^{-1}$ | 1.2 |
| Comparative Example 3 | C | " | " | $2.1 \times 10^{-1}$ | 1.1 |
| Comparative Example 4 | C | " | " | $1.1 \times 10^{-1}$ | 1.5 |

We claim:

1. A process for producing an aromatic polyimide separating membrane, comprising the steps of:
   (A) preparing a dope solution containing an aromatic polyamic acid dissolved in a polar organic solvent at a temperature not above about 100° C., said polyamic acid having been prepared by polymerizing a carboxylic acid component consisting essentially of at least one aromatic tetracarboxylic acid compound selected from the group consisting of 3,3',4,4'- and 2,3,3',4'-biphenyl tetracarboxylic acids, 3,3',4,4'-benzophenone tetracarboxylic acid, 2,2-bis (3,4-dicarboxyphenyl) propane, bis (3,4-dicarboxyphenyl) methane, bis (3,4-dicarboxyphenyl) sulfone, bis (3,4-dicarboxyphenyl) ether, bis (3,4-dicarboxyphenyl) thioether, pyromellitic acid and acid anhydrides, salts and lower alcohol esters of the above acids, with a diamine component consisting of at least one aromatic diamine compound at a temperature of 120° C. or less in a polar organic solvent consisting essentially of at least one member selected from the group consisting of acetamide, formamide, N,N-dimethylformamide, N,N-dimethylacetamide, N,N-diethylacetamide, dimethylsulfoxide, diethylsulfoxide, hexamethylphosphoric amide, N-methyl-2-pyrrolidone, pyridine, dimethylsulfones, tetramethylenesulfone, dimethyltetramethylenesulfone, tetramethyl urea, tetraethyl urea and N-methyl caprolactam
   (B) forming a thin film of said aromatic polyamic acid dope solution;
   (C) bringing said thin film of said aromatic polyamic acid dope solution into contact with a coagulating liquid containing at least 60% by volume of at least one member selected from the group consisting of water and lower aliphatic alcohols having 1 to 5 carbon atoms at a temperature not higher than 60° C., to form a coagulated membrane of said aromatic polyamic acid;
   (D) drying said coagulated membrane of said aromatic polyamic acid; and
   (E) heating said dried aromatic polyamic acid membrane at a temperature of 100° C. to 300° C. whereby said aromatic polyamic acid membrane is converted to a separating porous aromatic polyimide membrane which exhibits a hydrogen gas-permeating rate ($pH_2$) not lower than $5 \times 10^{-5}$ $cm^3/cm^2$ sec cmHg and a ratio ($pH_2/CO$) of the hydrogen gas-permeating rate ($pH_2$) to carbon monoxide gas-permeating rate ($pCO$) in the range of from 2.0 to 10, determined at a temperature of 30° C. under a pressure of from 0.5 to 1 kg/cm²G.

2. The process as claimed in claim 1, wherein said polyamic acid contains at least 60 molar % of at least one type of recurring unit of the formula (I):

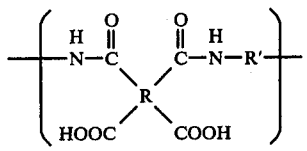  (I)

wherein R represents a tetravalent aromatic radical and R' represents a divalent aromatic radical.

3. The process as claimed in claim 2, wherein said polyamic acid exhibits a logarithmic viscosity of from 0.3 to 7, which has been determined at a concentration of 0.5 g per 100 ml of N-methyl-2-pyrrolidone at a temperature of 30° C.

4. The process as claimed in claim 1, wherein said aromatic diamine compound is selected from the group consisting of those of the formulae (II) through (V)

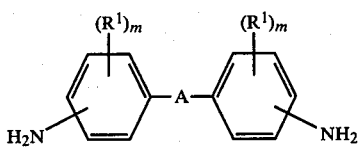  (II)

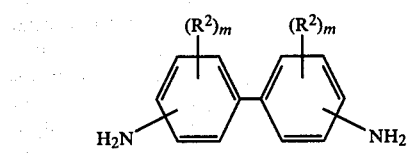  (III)

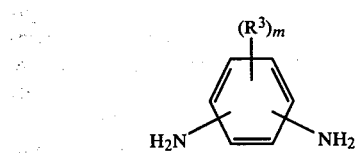  (IV)

and

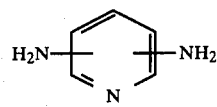  (V)

wherein $R^1$, $R^2$ and $R^3$ respectively represent, independently from each other, a member selected from the group consisting of hydrogen atom, lower alkyl radicals having 1 to 3 carbon atoms and lower alkoxyl radicals having 1 to 3 carbon atoms; A represents a divalent linking member selected from the class consisting of —O—, —S—, —CO—, —SO$_2$—, —SO—, —CH$_2$— and —C(CH$_3$)$_2$—; and m represents an integer of from 1 to 4.

5. The process as claimed in claim 1, wherein the concentration of said aromatic polyamic acid in said dope solution is in the range of from 3% to 50% by weight.

6. The process as claimed in claim 1, wherein said dope solution exhibits a rotation viscosity of from 1 to 100,000 poises at a temperature or 30° C.

7. The process as claimed in claim 1, wherein the forming procedure of said thin dope solution film is carried out at a temperature of 80° C. or less.

8. The process as claimed in claim 1, wherein the thin dope solution film has a thickness of from 5 to 1000 microns.

9. The process as claimed in claim 1, wherein the coagulation procedure of said thin dope solution film is carried out at a temperature of 50° C. or less.

10. The process as claimed in claim 1, wherein the coagulation procedure of said thin dope solution film is carried out for 0.01 to 50 hours.

11. The process as claimed in claim 1, wherein the drying procedure is carried out at a temperature of from 30° C. to 150° C.

12. The process as claimed in claim 1, wherein the drying procedure is carried out in an inert gas atmoshpere.

13. The process as claimed in claim 1, wherein the heating procedure is carried out at a temperature of from 160° C. to 260° C.

14. The process as claimed in claim 1, wherein the heating procedure is carried out in an inert gas atmosphere.

15. The process as claimed in claim 1, wherein the resultant membrane is a porous aromatic polyimide separating membrane having a thickness of from 1 to 200 microns.

* * * * *